US 8,699,482 B2

(12) United States Patent
Miyashita

(10) Patent No.: US 8,699,482 B2
(45) Date of Patent: Apr. 15, 2014

(54) COMMUNICATION SYSTEM AND COMMUNICATION METHOD

(75) Inventor: Shigehiro Miyashita, Tokyo (JP)

(73) Assignee: NEC Corporation, Tokyo (JP)

( * ) Notice: Subject to any disclaimer, the term of this patent is extended or adjusted under 35 U.S.C. 154(b) by 254 days.

(21) Appl. No.: 12/934,041

(22) PCT Filed: Mar. 18, 2009

(86) PCT No.: PCT/JP2009/055339
§ 371 (c)(1),
(2), (4) Date: Sep. 22, 2010

(87) PCT Pub. No.: WO2009/122915
PCT Pub. Date: Oct. 8, 2009

(65) Prior Publication Data
US 2011/0044334 A1 Feb. 24, 2011

(30) Foreign Application Priority Data
Apr. 2, 2008 (JP) ................................. 2008-096130

(51) Int. Cl.
*H04L 12/66* (2006.01)
(52) U.S. Cl.
USPC ........... 370/352; 370/389; 370/353; 370/356; 370/473
(58) Field of Classification Search
USPC ................. 370/389, 473, 474, 352–356, 349, 370/310.2, 312, 328, 338, 465–467, 469; 709/229; 379/201.01
See application file for complete search history.

(56) References Cited

U.S. PATENT DOCUMENTS

| 5,809,415 | A | * | 9/1998 | Rossmann | 455/422.1 |
| 6,600,736 | B1 | * | 7/2003 | Ball et al. | 370/352 |
| 6,661,784 | B1 | * | 12/2003 | Nykanen | 370/338 |
| 6,914,897 | B1 | * | 7/2005 | Schuster et al. | 370/352 |
| 6,944,678 | B2 | * | 9/2005 | Lu et al. | 709/245 |
| 7,480,260 | B1 | * | 1/2009 | Vashisht et al. | 370/260 |
| 8,184,641 | B2 | * | 5/2012 | Alt et al. | 370/395.54 |
| 8,428,047 | B2 | * | 4/2013 | Goss | 370/352 |
| 2002/0176427 | A1 | * | 11/2002 | Noda et al. | 370/401 |
| 2005/0163105 | A1 | * | 7/2005 | Naick et al. | 370/352 |
| 2006/0077988 | A1 | * | 4/2006 | Cheng et al. | 370/401 |
| 2006/0153161 | A1 | * | 7/2006 | Nishikawa | 370/352 |

(Continued)

FOREIGN PATENT DOCUMENTS

| JP | 10-177552 A | 6/1998 |
| JP | 2002189973 A | 7/2002 |

(Continued)

OTHER PUBLICATIONS

International Search Report for PCT/JP2009/055339 mailed Apr. 21, 2009.

*Primary Examiner* — Dang Ton
*Assistant Examiner* — Sai Aung
(74) *Attorney, Agent, or Firm* — Sughrue Mion, PLLC

(57) ABSTRACT

In a communication system in which computer 20 transmits an HTTP request to WWW server 70 via broadband router apparatus 30 and the Internet 50, and WWW server 70 transmits an HTTP response to computer 20 according to the received HTTP request, broadband router apparatus 30 establishes an IP phone session and a TCP connection with HTTP proxy server 620 upon receiving the HTTP request from computer 20, and transmits the received HTTP request to WWW server 70 via HTTP proxy server 620.

8 Claims, 5 Drawing Sheets

(56) References Cited

U.S. PATENT DOCUMENTS

| | | |
|---|---|---|
| 2006/0187858 A1* | 8/2006 | Kenichi et al. .............. 370/254 |
| 2006/0218301 A1* | 9/2006 | O'Toole et al. .............. 709/244 |
| 2006/0262916 A1* | 11/2006 | Marascio et al. ........ 379/201.01 |
| 2007/0030843 A1* | 2/2007 | Miller et al. ................. 370/352 |
| 2007/0115921 A1* | 5/2007 | Schneider et al. ........... 370/352 |
| 2007/0169181 A1* | 7/2007 | Roskind ............................ 726/5 |
| 2007/0189266 A1* | 8/2007 | Izumi et al. .................. 370/352 |
| 2008/0016230 A1* | 1/2008 | Holtmanns et al. ........... 709/229 |
| 2008/0037518 A1* | 2/2008 | Kumarasamy et al. ....... 370/352 |
| 2008/0046735 A1* | 2/2008 | Nedeltchev et al. .......... 713/173 |
| 2008/0293403 A1* | 11/2008 | Quon et al. ................. 455/426.1 |
| 2009/0034521 A1* | 2/2009 | Kato ............................. 370/389 |
| 2009/0262668 A1* | 10/2009 | Hemar et al. ................ 370/260 |
| 2010/0235283 A1* | 9/2010 | Gerson .......................... 705/75 |

FOREIGN PATENT DOCUMENTS

| | | |
|---|---|---|
| JP | 2003143236 A | 5/2003 |
| JP | 2004254346 A | 9/2004 |
| JP | 2005191738 A | 7/2005 |
| JP | 2006067362 A | 3/2006 |
| JP | 2006067363 A | 3/2006 |
| JP | 2006262418 A | 9/2006 |
| JP | 2006270273 A | 10/2006 |
| JP | 2007135044 A | 5/2007 |
| JP | 2007293811 A | 11/2007 |
| WO | 2006032993 A | 3/2006 |

* cited by examiner

Fig.2

| IP phone number | URL | authentication information |
|---|---|---|
| T1 | http://www.aaaa.co.jp/bbb | yxxxx1 |
| T1 | http://www.bbbb.co.jp/ccc | yxxxxx2 |
| T1 | http://www.cccc.co.jp/aaa | yxxxxx3 |
| T2 | http://www.dddd.com/eee | xxyyy1 |
| T2 | http://www.eeee.com/fff | yyyyy2 |
| T3 | http://www.ffff.com/ggg | zzzzz1 |
| T4 | http://www.gggg.com/hhh | zwzww1 |
| ...... | ...... | ...... |

624a: IP phone number
624b: URL
624c: authentication information
624: authentication table

Fig.3

| IP phone number | URL | communication start date and time | communication end date and time | determination |
|---|---|---|---|---|
| T1 | http://www.aaaa.co.jp/aaa | March 1 10:50:45 | March 1 10:53:45 | 1 |
| T2 | http://www.bbbb.co.jp/bbb | March 1 12:34:20 | March 1 12:34:59 | 1 |
| T1 | http://www.cccc.co.jp/ccc | March 2 20:14:03 | March 2 20:15:14 | 1 |
| T2 | http://www.dddd.com/ddd | March 2 18:55:55 | March 2 19:00:01 | 1 |
| T3 | http://www.eeee.com/eee | March 3 07:03:21 | March 3 07:04:09 | 1 |
| T4 | http://www.ffff.com/fff | March 3 09:44:33 | March 3 09:47:00 | 1 |
| ...... | http://www.gggg.com/ggg | March 4 23:05:37 | March 4 23:10:59 | 0 |

634a — IP phone number
634b — URL
634c — communication start date and time
634d — communication end date and time
634e — determination
634 accounting management table

COMMUNICATION SYSTEM AND COMMUNICATION METHOD

This application is the National Phase of PCT/JP2009/055339, filed Mar. 18, 2009, which claims priority based on Japanese Patent Application No. 2008-096130 filed on Apr. 2, 2008, the disclosure of which is hereby incorporated in its entirety.

TECHNICAL FIELD

The present invention relates to a communication system and a communication method, and particularly to a communication system and communication method for a user to receive provisioning content from a server via a network such as the Internet.

BACKGROUND ART

Recently, the number of Websites providing paid high-value-added services for limited particular contracted users is increasing. In the case of providing paid services for limited particular contracted users, it is necessary for a Website operator to construct a mechanism for user authentication to prevent spoofing or for accounting information management to receive compensation for provided services. It is often the case that one user is under contract with multiple such Websites to access the Websites.

On the other hand, IP phones that do not use a conventional fixed telephone network but that use IP techniques have been widespread. One of the factors is that the phone usage fee is lower in comparison with a conventional fixed telephone. The IP phone has been often used by a company introducing a private branch exchange equipped with an IP phone function to reduce communication cost. Recently, however, broadband router apparatuses used to access the Internet in general households are equipped with the IP phone function, and an environment enabling the use of the IP phone is provided even for general households.

An IP phone provider providing such an IP phone uses the IP phone function equipped for a broadband router apparatus, and provides users with call services between IP phones and between an IP phone and an existing telephone via an IP phone network that the IP phone provider provides. Since the IP phone provider collects call fees as compensation therefore, the IP phone provider constructs a mechanism for user authentication and accounting information management.

As described above, though having a mechanism for user authentication and for accounting information management for IP phone users, the IP phone provider cannot use the mechanism for services other than the call service, for example, for authentication or for accounting information management at the time that a Website is being used.

This is because, in an IP phone, a protocol that is different from the protocol for HTTP communication used when a user uses a Website is standardized and used as the protocol that is used for origination/receipt of an IP phone call and authentication information exchange processing performed between an IP phone provider and a user.

As described, though having the mechanism for authentication and for accounting information management, an IP phone provider can use the mechanism only for provision of a call service. Therefore, the IP phone provider cannot cause the mechanism for authentication and accounting information management to be in conjunction with a Web service to provide a fee collecting service for collecting fees from Website users on behalf of a Website operator as Internet connection service providers providing services for accessing WWW servers and mobile phone providers do. That is, there is a problem in which the IP phone provider misses an opportunity for profit increase.

Furthermore, it is necessary for a Website operator providing services for limited particular contracted users to construct the mechanism for user authentication and for accounting information management. However, there is a problem in which it is a great cost burden for a Website operator to construct the mechanism for each Website.

Furthermore, there is a problem in which, when a Website user is under contract with multiple Websites providing services to limited users, the user has trouble preparing authentication information for each of the multiple Websites, and selects and uses the authentication information when using each Website.

DISCLOSURE OF THE INVENTION

The object of the present invention is to provide a communication system and a communication method capable of contributing to profit increase of an IP phone provider, enabling a Website operator to perform user authentication and accounting information management without additional new cost, and resolving the trouble of a Website user being authenticated for each Website.

In order to achieve the above object, the present invention provides a communication system comprising a computer, a broadband router apparatus connected to the computer, and a WWW sever connected to the broadband router apparatus via the Internet, the computer transmitting an HTTP request to the WWW server via the broadband router apparatus, and the WWW server transmitting an HTTP response to the computer according to the received HTTP request, wherein the system comprises:

first IP phone means for establishing an IP phone session with the broadband router apparatus; and first HTTP proxy means for establishing a TCP connection with the broadband router apparatus and terminating HTTP communication; and the broadband router apparatus comprises:

second HTTP proxy means for terminating HTTP communication, and, upon receiving an HTTP request from the computer, transmitting an IP phone connection request; and second IP phone means for, upon receiving the IP phone connection request, establishing an IP phone session with the first IP phone means and notifying the second HTTP proxy means to the effect that the IP phone session has been established;

when being notified by the second IP phone means that the IP phone session has been established, the second HTTP proxy means establishes a TCP connection with the first HTTP proxy means and transmits the HTTP request received from the computer to the first HTTP proxy means; and the first HTTP proxy means transmits the HTTP request received from the second HTTP proxy means to the WWW server, and transmits the HTTP response to the HTTP request, which has been received from the WWW server, to the second HTTP proxy means.

There is also provided a communication method in a communication system comprising a computer, a broadband router apparatus connected to the computer, a WWW sever connected to the broadband router apparatus via the Internet, and an HTTP proxy server establishing an IP phone session and a TCP connection with the broadband router apparatus and terminating HTTP communication, the computer transmitting an HTTP request to the WWW server via the broadband router apparatus, and the WWW server transmitting an HTTP response to the computer according to the received HTTP request, the method comprising the steps of:

the broadband router apparatus establishing an IP phone session with the HTTP proxy server upon receiving an HTTP request from the computer;

the broadband router apparatus establishing a TCP connection with the HTTP proxy server when the IP phone session is established;

the broadband router apparatus transmitting the HTTP request received from the computer to the HTTP proxy server when the TCP connection is established; and the HTTP proxy server transmitting an HTTP response to the HTTP request, which has been received from the WWW server, to the broadband router apparatus.

Since the present invention is configured as described above, an IP phone provider can cause a mechanism for authentication and accounting information management to be in conjunction with a Web service to provide a fee collecting service for collecting fees from Website users on behalf of a Website operator as Internet connection service providers providing services for accessing WWW servers and mobile phone providers do, and does not miss an opportunity for profit increase.

Furthermore, a Website operator providing services to limited particular contracted users can avoid the cost burden for constructing the mechanism for user authentication and account information management.

Furthermore, when a Website user is under contract with multiple Websites providing services to limited users, the user does not have to prepare authentication information for each of the multiple Websites or select the authentication information for use when using each Website.

BRIEF DESCRIPTION OF THE DRAWINGS

FIG. 2 is a diagram showing an example of the configuration of an authentication table stored in a proxy authentication database shown in FIG. 1;

FIG. 3 is a diagram showing an example of the configuration of an accounting management table stored in an accounting information database shown in FIG. 1;

BEST MODE FOR CARRYING OUT THE INVENTION

Figure 1:
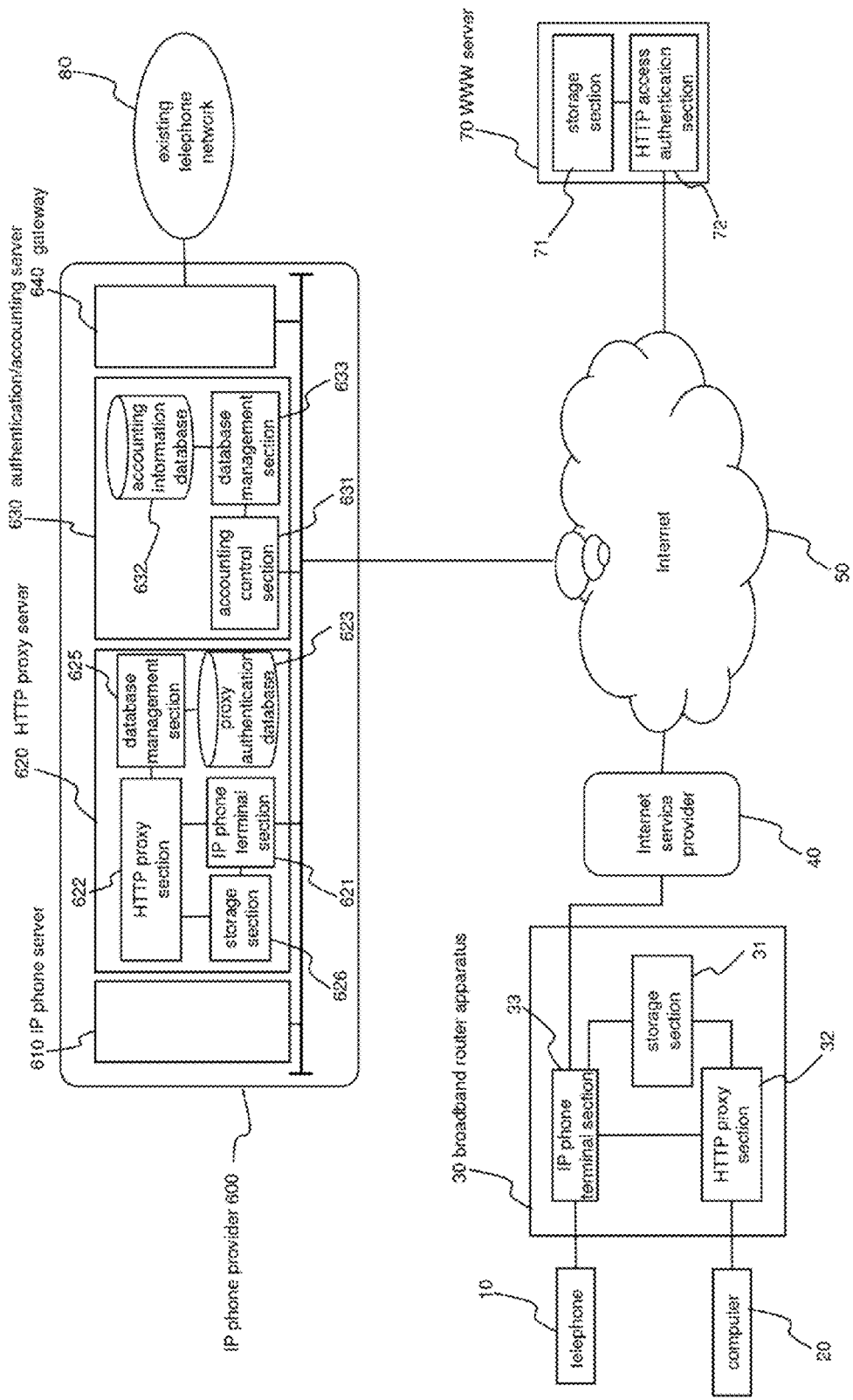
FIG. 1 is a diagram showing an exemplary embodiment of an authentication/accounting system to which a communication system of the present invention is applied.

An exemplary embodiment will be described below with reference to drawings, in a case in which SIP (Session Initiation Protocol) used as an IP phone call control protocol is taken as an example.

In SIP, IP phone call control for origination/receipt is performed by transmitting/receiving messages between an IP phone and a server held by an IP phone provider. The server has a function of performing user authentication, making association between an IP phone number and an IP address, and performing accounting information management. Establishment and disconnection of an IP phone session using SIP, which is performed when an IP phone call is made, will be described below.

In the case of desiring to make an IP phone call, an origination-source user picks up the receiver and inputs a receipt-destination IP phone number, and then, the IP phone transmits INVITE, a message for starting an IP phone session, to a server. This INVITE message includes the IP phone number of the receipt-destination, the IP phone number of the origination-source, and the IP address of the origination-source. This message also includes an origination-source port number of UDP (User Datagram Protocol), which is a protocol commonly used to transmit/receive actual IP phone call data, so that the receipt-destination can correctly transmit a call packet to the origination-source. This message also includes authentication information based on a username and password that the IP phone user registered with an IP phone provider so that the server authenticates whether the origination-source is an authorized user.

Upon receiving the INVITE message, the server judges whether the origination-source is an authorized user from the authentication information included in the INVITE message. Then, if judging that the origination-source is an authorized user, the server identifies the IP address of the receipt-destination from the IP phone number of the receipt-destination included in the INVITE message and transmits the received INVITE message to an IP phone having the identified IP address.

Upon receiving the INVITE message, the receipt-destination IP phone rings the ringtone. Then, when the receipt-destination user picks up the receiver of the IP phone, the receipt-destination IP phone transmits a response for notifying it, to the origination-source IP phone via the server. Upon receiving the response, the origination-source IP phone transmits an ACK message for confirming establishment of an IP phone session, to the receipt-destination IP phone via the server. Upon receiving the ACK message, the receipt-destination IP phone similarly transmits an ACK message to the origination-source IP phone via the server.

By this series of communications, an IP phone session between the origination-source IP phone and the receipt-destination IP phone is established. It becomes possible to make a call, and a call packet is transmitted and received.

When the call is completed, and the receiver of the origination-source IP phone is put down, the origination-source IP phone transmits a BYE message for disconnecting the IP phone session, to the receipt-destination IP phone via the server.

Upon receiving the BYE message, the receipt-destination IP phone transmits a message to the effect that it has received the BYE message, to the origination-source IP phone via the server.

By this series of communications, the IP phone session between the origination-source IP phone and the receipt-destination IP phone is disconnected.

FIG. 1 is a diagram showing an exemplary embodiment of an authentication/accounting system to which a communication system of the present invention is applied.

The authentication/accounting system of this exemplary embodiment is provided with telephone 10, computer 20, broadband router apparatus 30 connected to telephone 10 and computer 20, and WWW server 70.

Broadband router apparatus 30 is connected to Internet 50 via Internet service provider 40 with which the user of broadband router apparatus 30 is under contract, and is connected to IP phone provider 600 with which the user of broadband router apparatus 30 is under contract and WWW server 70 via Internet 50. IP phone provider 600 is connected to existing telephone network 80 so that the users of IP phones can mutually make a call with users of existing telephones.

IP phone provider 600 is provided with IP phone server 610, HTTP proxy server 620, authentication/accounting server 630, which is communication recording management means, and gateway 640.

IP phone server 610 has IP phone users' usernames, authentication information, and information about correspondence between IP phone numbers and IP addresses.

Upon receiving an INVITE message from an origination-source, IP phone server 610 judges whether the origination-source is an authorized user of IP phone provider 600 from authentication information included in this INVITE message. If judging that the origination-source is an authorized user, IP phone server 610 identifies a corresponding IP address from the IP phone number of a receipt-destination included in the received INVITE message and transmits the received INVITE message to an apparatus having the identified IP address. IP phone server 610 also mediates transmission/receipt of messages between the origination-source IP phone and the receipt-destination IP phone until an IP phone session is established.

On the other hand, if judging that the origination-source is not an authorized user from the authentication information included in the received INVITE message, IP phone server 610 notifies the origination-source to transmit an INVITE message including correct authentication information.

HTTP proxy server 620 is provided with IP phone terminal section 621 which is first IP phone means, HTTP proxy section 622 which is first HTTP proxy means, proxy authentication database 623 which is a database, database management section 625, and storage section 626 which is storage means.

Upon receiving an INVITE message destined to HTTP proxy server 620 from IP phone server 610, IP phone terminal section 621 transmits a response to the effect that it has received the INVITE message, to IP phone server 610 and establishes an IP phone session with the transmission source of the INVITE message. Furthermore, IP phone terminal section 621 extracts the IP phone number and IP address of the origination-source from the received INVITE message and transmits them to storage section 626.

HTTP proxy section 622 has a function of terminating HTTP communication. Upon receiving an HTTP request, HTTP proxy section 622 generates an HTTP request by changing the transmission source of the received HTTP request to HTTP proxy server 620 and transmits the generated HTTP request to the destination of the received HTTP request. Upon receiving an HTTP response, HTTP proxy section 622 generates an HTTP response by changing the transmission source of the received HTTP response to HTTP proxy server 620 and transmits the generated HTTP response to the destination of the received HTTP response. Furthermore, if an HTTP access authentication request is transmitted from WWW server 70 to an HTTP request transmitted from HTTP proxy section 622 to WWW server 70, HTTP proxy section 622 acquires an IP phone number from storage section 626 corresponding to the transmission-source IP address of the received HTTP request. Then, HTTP proxy section 622 requests database management section 625 to extract authentication information to which both of the acquired IP phone number and an URL (Uniform Resource Locator) of content on WWW server 70, which is included in the received HTTP request, correspond. As a result, if the authentication information, to which both correspond, can be acquired from database management section 625, HTTP proxy section 622 adds the authentication information acquired from database management section 625 to the HTTP request transmitted to WWW server 70 once and transmits the HTTP request added with the authentication information to WWW server 70 again.

Upon receiving an HTTP response to the HTTP request added with the authentication information and transmitted to WWW server 70, from WWW server 70, HTTP proxy section 622 acquires an IP phone number corresponding to the transmission-source IP address of the received HTTP request, from storage section 626. Then, HTTP proxy section 622 transmits the acquired IP phone number, the URL of the content on WWW server 70, which is included in the received HTTP request, and a communication recording start notification to authentication/accounting server 630. When the HTTP response to the HTTP request for which the authentication information is required is normally completed, HTTP proxy section 622 acquires an IP phone number from storage section 626 corresponding to the transmission-source IP address of the received HTTP request. Then, HTTP proxy section 622 transmits the acquired IP phone number, the URL of the content on WWW server 70 for which authentication is required, which is included in the received HTTP request, and a communication recording stop notification to authentication/accounting server 630.

On the other hand, if HTTP proxy section 622 cannot acquire the authentication information to which both the IP phone number of the origination-source of the HTTP request and the URL of the content on WWW server 70 correspond, from database management section 625, then HTTP proxy section 622 notifies broadband router apparatus 30 to that effect.

FIG. 2 is a diagram showing an example of the configuration of an authentication table stored in proxy authentication database 623 shown in FIG. 1.

As shown in FIG. 2, authentication table 624 has IP phone number column 624a, URL column 624b and authentication information column 624c.

Returning to FIG. 1, database management section 625 performs management of data stored in proxy authentication database 623 and performs processing for data addition to, deletion from, reference to and extraction from tables in proxy authentication database 623 according to requests from IP phone server 610 and HTTP proxy server 620. Upon receiving an authentication information extraction request accompanied by an IP phone number and an URL, database management section 625 searches IP phone number column 624a and URL column 624b of authentication table 624. Then, authentication table 624 extracts authentication information to which both the received IP phone number and URL correspond, from authentication information column 624c and transmits it to HTTP proxy section 622. On the other hand, if the corresponding authentication information does not exist, database management section 625 notifies HTTP proxy section 622 to that effect.

Upon receiving the IP phone number and IP address of an origination-source included in an INVITE message received by IP phone terminal section 621, storage section 626 stores them in association with each other.

Authentication/accounting server 630 is provided with accounting control section 631, accounting information database 632 and database management section 633. Authentication/accounting server 630 manages the IP phone communication states of the users of IP phone provider 600, and sums up and stores a communication fee for each of the users' IP phone numbers and for each communication according to the IP phone communication state.

Upon receiving a communication recording start notification, an IP phone number and an URL from HTTP proxy section 622, accounting control section 631 transmits a communication recording start notification together with the received IP phone number and URL to database management section 633. Upon receiving a communication recording stop notification, an IP phone number and an URL from HTTP proxy section 622 or IP phone server 610, accounting control section 631 transmits a communication recording stop notification together with the received IP phone number and URL to database management section 633.

FIG. 3 is a diagram showing an example of the configuration of an accounting management table stored in accounting information database 632 shown in FIG. 1.

As shown in FIG. 3, accounting management table 634 has IP phone number column 634*a*, URL column 634*b*, communication start date and time column 634*c*, communication end date and time column 634*d* and determination column 634*e*.

Returning to FIG. 1, database management section 633 performs management of data stored in accounting information database 632 and performs processing for data addition to, deletion from, reference to and extraction from tables in accounting information database 632 according to requests from IP phone server 610 and HTTP proxy server 620. Upon receiving a communication recording start notification together with an IP phone number and an URL from accounting control section 631, database management section 633 adds a line to accounting management table 634, writes the received IP phone number and URL into IP phone number column 634*a* and URL column 634*b*, respectively, and writes the date and time of receiving the communication recording start notification and 0 indicating that communication has not been completed, into communication start date and time column 634*c* and determination column 634*e*, respectively. Upon receiving a communication recording stop notification together with an IP phone number and an URL from accounting control section 631, database management section 633 searches IP phone number column 634*a* and URL column 634*b* of accounting management table 634, writes the date and time of receiving the communication recording stop notification into communication end date and time column 634*d* on a line to which both the received IP phone number and URL correspond, and rewrites determination column 624*e* with 1 indicating that communication has been completed.

Gateway 640 connects IP phone provider 600 and existing telephone network 80 to enable mutual calls between the subscribers of IP phone provider 600 and the subscribers of existing telephone network 80.

Broadband router apparatus 30 is provided with storage section 31, HTTP proxy section 32 which is second HTTP proxy means, and IP phone terminal section 33 which is second IP phone means.

Storage section 31 stores an IP address usable on the Internet given by Internet service provider 40, an IP phone number given by IP phone provider 600, a username and password registered with IP phone provider 600, and the IP phone number of HTTP proxy server 620 of IP phone provider 600.

HTTP proxy section 32 has a function of terminating HTTP communication.

Upon receiving an HTTP request from computer 20, HTTP proxy section 32 acquires the IP phone number of HTTP proxy server 620 of IP phone provider 600 from storage section 31. Then, HTTP proxy section 32 transmits an IP phone connection request with HTTP proxy server 620 of IP phone provider 600 specified as the receipt-destination, together with the acquired IP phone number, to IP phone terminal section 33. Upon receiving an IP phone session establishment notification from IP phone terminal section 33, HTTP proxy section 32 establishes TCP connection with HTTP proxy server 620. Then, HTTP proxy section 32 generates an HTTP request by changing the transmission source of the HTTP request received from computer 20 to broadband router apparatus 30 and transmits the generated HTTP request to HTTP proxy server 620. HTTP proxy section 32 also generates an HTTP response by changing the transmission source of an HTTP response received from HTTP proxy server 620 to broadband router apparatus 30 and transmits the generated HTTP request to computer 20. When HTTP communication between computer 20 and WWW server 70 ends, HTTP proxy section 32 disconnects TCP connection with HTTP proxy server 620 and transmits an IP phone connection cutting request to IP phone terminal section 33.

IP phone terminal section 33 acquires the username and password of the user of broadband router apparatus 30 registered with IP phone provider 600 from storage section 31 and generates authentication information on the basis of them. IP phone terminal section 33 also generates an INVITE message including the IP phone number and IP address of broadband router apparatus 30 acquired from storage section 31, the IP phone number of a receipt-destination and generated authentication information. When the INVITE message is generated, it is written in the INVITE message that UDP is to be used for communication after establishment of an IP phone session, in the case of receiving an IP phone connection request from telephone 10. On the other hand, in the case of receiving an IP phone connection request from HTTP proxy section 32, it is written in the INVITE message that TCP (Transmission Control Protocol) is to be used. When having generated the INVITE message, IP phone terminal section 33 transmits the generated INVITED message to IP phone server 610. When an IP phone session is established between HTTP proxy server 620 and IP phone terminal section 33, IP phone terminal section 33 notifies HTTP proxy section 32 to that effect. Upon receiving an IP phone connection cutting request from HTTP Proxy section 32, IP phone terminal section 33 generates a BYE message and transmits the generated BYE message to IP phone server 610.

WWW server 70 is provided with storage section 71 and HTTP access authentication section 72.

Storage section 71 stores content to be provided for a user who has transmitted an HTTP request to WWW server 70.

HTTP access authentication section 72 restricts access to content stored in storage section 71. As for such content in which disclosure destinations are limited, HTTP access authentication section 72 judges whether the content can be disclosed or not on the basis of authentication information included in an HTTP request from a transmission source. If the authentication information is correct, then HTTP access authentication section 72 transmits an HTTP response according to the HTTP request to the HTTP request transmission source. If the authentication information is not correct, then HTTP access authentication section 72 notifies the HTTP request transmission source to that effect.

Description will be made below on the operation in the case of performing HTTP communication with WWW server 70 via IP phone provider 600 from computer 20 in the authentication/accounting system configured as described above.

First, description will be made on the operation in the case where authentication information in proxy authentication database 623 of HTTP proxy server 620 is unnecessary.

Figure 4:
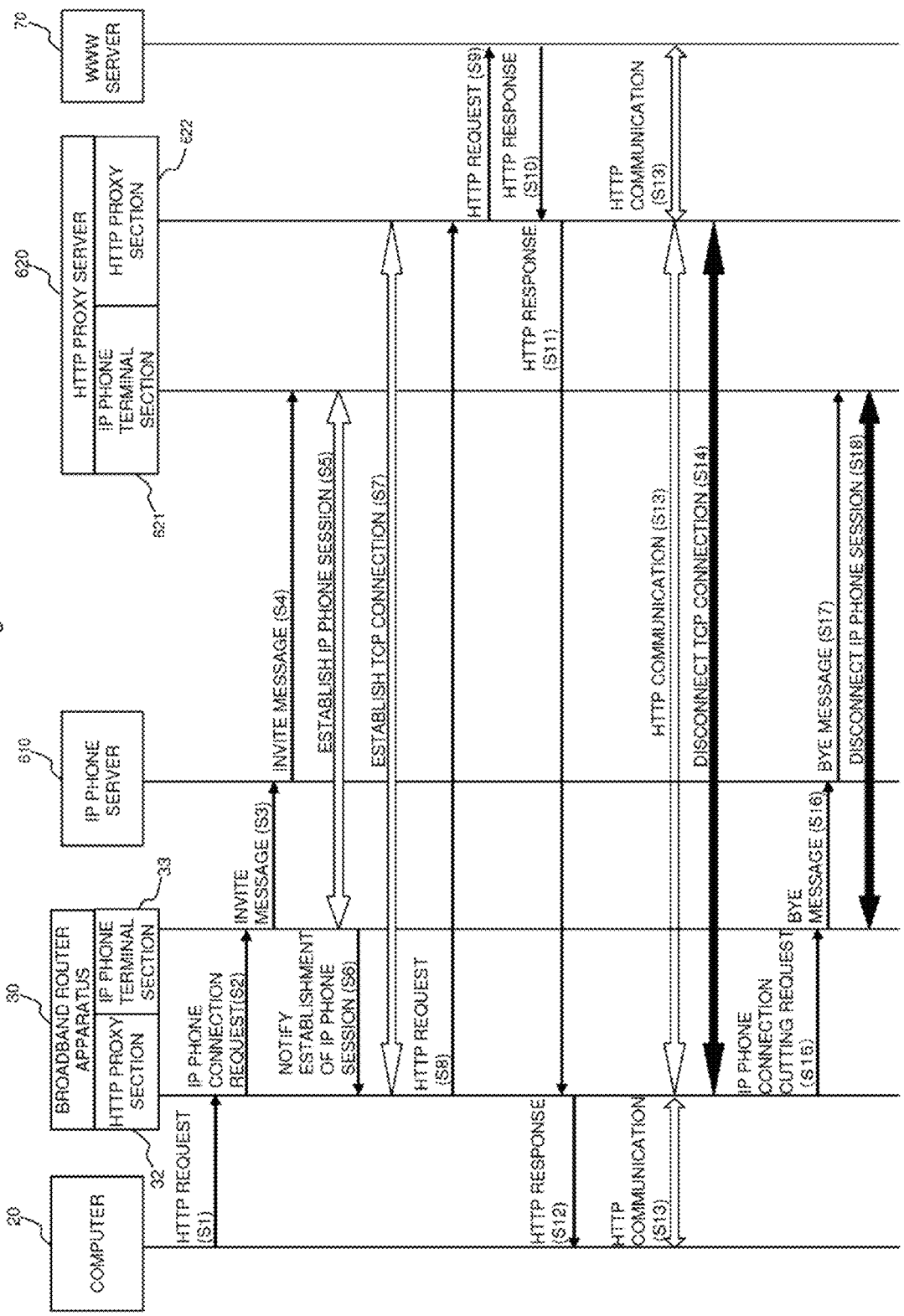
FIG. 4 is a sequence diagram for illustrating an example of an HTTP communication method in the case where authentication using the proxy authentication database is unnecessary in the authentication/accounting system shown in FIGS. 1 to 3.

FIG. 4 is a sequence diagram for illustrating an example of an HTTP communication method in the case where authentication information in proxy authentication database 623 is unnecessary in the authentication/accounting system shown in FIGS. 1 to 3.

In order to access content on WWW server 70, computer 20 first transmits an HTTP request for the content on WWW server 70 to HTTP proxy section 32 of broadband router apparatus 30 (step S1).

Upon receiving the HTTP request transmitted from computer 20, HTTP proxy section 32 of broadband router apparatus 30 acquires the IP phone number of HTTP proxy server 620 of IP phone provider 600 from storage section 31 and transmits the acquired IP phone number and an IP phone connection request to IP phone terminal section 33 (step S2).

Upon receiving the IP phone connection request, IP phone terminal section 33 acquires a username and password registered with IP phone provider 600 from storage section 31 and generates authentication information on the basis of them.

Next, IP phone terminal section 33 generates an INVITE message including the IP phone number of broadband router apparatus 30 acquired from storage section 31 and its IP address as origination-source information, the IP phone number of HTTP proxy server 620 of IP phone provider 600 received from HTTP proxy section 32 as receipt-destination information, and the generated authentication information, and specifying TCP as a protocol to be used after establishment of an IP phone session. Then, the generated INVITE message is transmitted to IP phone server 610 (step S3).

Upon receiving the INVITE message transmitted from broadband router apparatus 30, IP phone server 610 judges whether the origination-source is an authorized user of IP phone provider 600 from the authentication information included in the received INVITE message. If judging that the origination-source is an authorized user, then IP phone server 610 identifies a corresponding IP address from the IP phone number of HTTP proxy server 620 included in this INVITE message as a receipt-destination IP phone number, and then transmits the received INVITE message to HTTP proxy server 620 having the identified IP address (step S4).

After that, message transmission/receipt by SIP is performed between IP phone terminal section 33 of broadband router apparatus 30 and IP phone terminal section 621 of HTTP proxy server 620 via IP phone server 610, and an IP phone session is established between IP phone terminal section 33 of broadband router apparatus 30 and IP phone terminal section 621 of HTTP proxy server 620 (step S5).

When the IP phone session is established, IP phone terminal section 621 transmits the IP phone number and IP address of broadband router apparatus 30 included in the received INVITE message to storage section 626.

Next, IP phone terminal section 33 of broadband router apparatus 30 notifies HTTP proxy section 32 that the IP phone session has been established (step S6).

Upon receiving the IP phone session establishment notification, HTTP proxy section 32 establishes a TCP connection with HTTP proxy section 622 of HTTP proxy server 620 (step S7), and transmits an HTTP request, obtained by changing the transmission source of the HTTP request received from computer 20 at step S1 to broadband router apparatus 30, to HTTP proxy server 620 (step S8).

Upon receiving the HTTP request transmitted from HTTP proxy section 32 of broadband router apparatus 30, HTTP proxy section 622 of HTTP proxy server 620 generates an HTTP request by changing the transmission source of the received HTTP request to HTTP proxy server 620, and then transmits the generated HTTP request to WWW server 70 (step S9).

Upon receiving the HTTP request transmitted from HTTP proxy section 622 of HTTP proxy server 620, WWW server 70 extracts the content requested by the HTTP request from storage section 71. Then, WWW server 70 transmits an HTTP response including the extracted content, with HTTP proxy server 620 as the transmission destination (step S10).

Upon receiving the HTTP response transmitted from WWW server 70, HTTP proxy section 622 of HTTP proxy server 620 generates an HTTP response by changing the transmission source of the received HTTP response to HTTP proxy server 620, and transmits the generated HTTP response to broadband router apparatus 30 (step S11).

Upon receiving the HTTP response from HTTP proxy section 622 of HTTP proxy server 620, HTTP proxy section 32 of broadband router apparatus 30 generates an HTTP response by changing the transmission source of the received HTTP response to broadband router apparatus 30, and transmits it to computer 20 (step S12).

After that, HTTP communication is performed between computer 20 and WWW server 70 via HTTP proxy section 32 of broadband router apparatus 30 and HTTP proxy section 622 of HTTP proxy server 620 according to the HTTP request from computer 20 (step S13).

After that, when communication between computer 20 and WWW server 70 ends, HTTP proxy section 32 of broadband router apparatus 30 disconnects the TCP connection (step S14).

When the TCP connection is disconnected, HTTP proxy section 32 of broadband router apparatus 30 makes an IP phone connection cutting request to IP phone terminal section 33 (step S15).

Upon receiving the IP phone cutting request, IP phone terminal section 33 generates a BYE message and transmits it to HTTP proxy server 620 via IP phone server 610 (steps S16 to S17).

Upon receiving the BYE message, IP phone terminal section 621 of HTTP proxy server 620 transmits a response to the effect that it has received the BYE message, to IP phone terminal section 33 of broadband router apparatus 30 via IP phone server 610. When IP phone terminal section 33 receives this response, the IP phone session is disconnected (step S18).

Next, description will be made on the operation in the case of using authentication information in proxy authentication database 623 of HTTP proxy server 620. This is on the assumption that an HTTP request transmitted from computer 20 to WWW server 70 includes a request for paid content.

Figure 5:
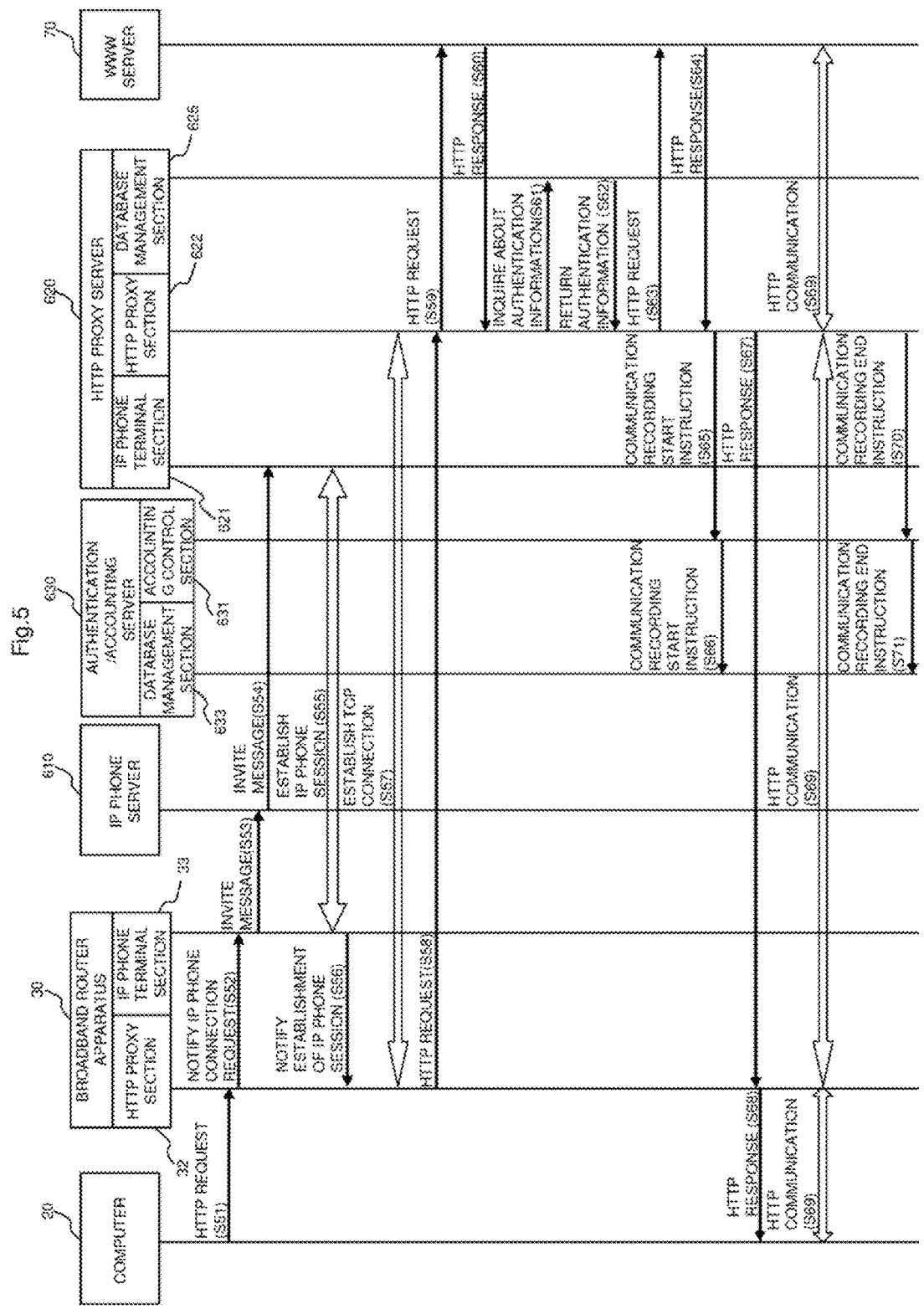
FIG. 5 is a sequence diagram for illustrating an example of an HTTP communication method in the case where authentication using the proxy authentication database is necessary in the authentication/accounting system shown in FIGS. 1 to 3.

FIG. 5 is a sequence diagram for illustrating an example of an HTTP communication method in the case where authentication using the proxy authentication database is necessary in the authentication/accounting system shown in FIGS. 1 to 3.

In order to access content on WWW server 70, computer 20 first transmits an HTTP request for the content on WWW server 70 to HTTP proxy section 32 of broadband router apparatus 30 (step S51).

Upon receiving the HTTP request transmitted from computer 20, HTTP proxy section 32 of broadband router apparatus 30 acquires the IP phone number of HTTP proxy server 620 of IP phone provider 600 from storage section 31 and transmits the acquired IP phone number and an IP phone connection request to IP phone terminal section 33 (step S52).

Upon receiving the IP phone connection request, IP phone terminal section 33 acquires a username and password registered with IP phone provider 600 from storage section 31 and generates authentication information on the basis of them.

Next, IP phone terminal section 33 generates an INVITE message including the IP phone number of broadband router apparatus 30 acquired from storage section 31 and its IP address as origination-source information, the IP phone number of HTTP proxy server 620 of IP phone provider 600 received from HTTP proxy section 32 as receipt-destination information, and the generated authentication information, and specifying TCP as a protocol to be used after establishment of an IP phone session. Then, the generated INVITE message is transmitted to IP phone server 610 (step S53).

Upon receiving the INVITE message transmitted from broadband router apparatus 30, IP phone server 610 judges whether the origination-source is an authorized user of IP phone provider 600 from the authentication information included in the received INVITE message. If judging that the origination-source is an authorized user, then IP phone server 610 identifies a corresponding IP address from the IP phone number of HTTP proxy server 620 included in this INVITE message as a receipt-destination IP phone number, and then transmits the received INVITE message to HTTP proxy server 620 having the identified IP address (step S54).

After that, message transmission/receipt by SIP is performed between IP phone terminal section 33 of broadband router apparatus 30 and IP phone terminal section 621 of HTTP proxy server 620 via IP phone server 610, and an IP phone session is established between IP phone terminal section 33 of broadband router apparatus 30 and IP phone terminal section 621 of HTTP proxy server 620 (step S55).

When the IP phone session is established, IP phone terminal section 621 transmits the IP phone number and IP address of broadband router apparatus 30 included in the received INVITE message to storage section 626.

Next, IP phone terminal section 33 of broadband router apparatus 30 notifies HTTP proxy section 32 that the IP phone session has been established (step S56).

Upon receiving the IP phone session establishment notification, HTTP proxy section 32 establishes a TCP connection with HTTP proxy section 622 of HTTP proxy server 620 (step S57), and transmits an HTTP request, obtained by changing the transmission source of the HTTP request received from computer 20 at step S51 to broadband router apparatus 30, to HTTP proxy server 620 (step S58).

Upon receiving the HTTP request transmitted from HTTP proxy section 32 of broadband router apparatus 30, HTTP proxy section 622 of HTTP proxy server 620 generates an HTTP request by changing the transmission source of the received HTTP request to HTTP proxy server 620, and then transmits the generated HTTP request to WWW server 70 (step S59).

Upon receiving the HTTP request transmitted from HTTP proxy section 622 of HTTP proxy server 620, HTTP access authentication section 72 of WWW server 70 transmits an HTTP response to the effect that it requests authentication information to HTTP proxy server 620 (step S60) because the content requested by the HTTP request is paid content.

Upon receiving the HTTP response transmitted from WWW server 70, HTTP proxy section 622 of HTTP proxy server 620 acquires the IP phone number of broadband router apparatus 30, corresponding to the transmission-source IP address of the HTTP request received from broadband router apparatus 30 at step S58, from storage section 626. Then, HTTP proxy section 622 requests database management section 625 to extract authentication information to which both the acquired IP phone number and the URL of the content on WWW server 70 for which authentication is required, which is included in the received HTTP request received from broadband router apparatus 30 at step S58 correspond (step S61).

Upon receiving the inquiry about the authentication information from HTTP proxy section 622, database management section 625 searches IP phone number column 624a and URL column 624b of authentication table 624. Then, database management section 625 extracts the authentication information to which both the IP phone number of broadband router apparatus 30 and the URL of the content on WWW server 70 included in the HTTP request received by HTTP proxy section 622 correspond, from authentication information column 624c and transmits it to HTTP proxy section 622 (step S62).

Upon receiving the authentication information from database management section 625, HTTP proxy section 622 generates an HTTP request by embedding the authentication information into the HTTP request received from HTTP proxy section 32 of broadband router apparatus 30 at step S58 and transmits the generated HTTP request to WWW server 70 (step S63).

Upon receiving the HTTP request from HTTP proxy section 622, HTTP access authentication section 72 of WWW server 70 checks the authentication information of the received HTTP request. Then, if authentication information held by HTTP access authentication section 71 and the authentication information included in the received HTTP request correspond to each other, HTTP access authentication section 72 transmits an HTTP response, with HTTP proxy server 620 as the transmission destination, according to the content requested in the received HTTP request (step S64).

Upon receiving the HTTP response, HTTP proxy section 622 acquires the IP phone number of broadband router apparatus 30, corresponding to the transmission-source IP address of the received HTTP request, from storage section 626. Then, HTTP proxy section 622 transmits the acquired IP phone number, the URL of the content on WWW server 70, which is included in the HTTP request received at step S58, and a communication recording start notification to authentication/accounting server 630 (step S65).

Upon receiving the communication recording start notification, accounting control section 631 of authentication/accounting server 630 transmits the communication recording start notification to database management section 633 together with the received IP phone number and URL (step S66).

Upon receiving the communication recording start notification, database management section 633 adds a line to accounting management table 634, and writes the received IP phone number of broadband router apparatus 30, the received URL of the content on WWW server 70 for which authentication is required, a date and time of receiving the communication recording start notification, and 0 indicating that communication has not been completed into IP phone number column 634a, URL column 634b, communication start date and time column 634c and determination column 634e, respectively.

HTTP proxy section 622 generates an HTTP response by changing the transmission source of the HTTP response received from WWW server 70 to HTTP proxy server 620, and transmits the generated HTTP response to HTTP proxy section 32 of broadband router apparatus 30 (step S67).

Upon receiving the HTTP response, HTTP proxy section 32 of broadband router apparatus 30 generates an HTTP response by changing the transmission source of the received HTTP response to broadband router apparatus 30 and transmits the generated HTTP response to computer 20 (step S68).

After that, computer 20 performs HTTP communication to acquire the content for which authentication by HTTP access authentication section 72 of WWW server 70 is required, via HTTP proxy section 32 of broadband router apparatus 30 and HTTP proxy section 622 of HTTP proxy server 620 (step S69).

When the HTTP communication of the content for which authentication by HTTP access authentication section 72 is required between computer 20 and WWW server 70 ends normally, HTTP proxy section 622 of HTTP proxy server 620 acquires the IP phone number of broadband router apparatus 30, corresponding to the IP address of the transmission source of the HTTP request, from storage section 626. Then, HTTP proxy section 622 transmits the acquired IP phone number, the URL of the content on WWW server 70 for which authentication is required, which is included in the HTTP request received at step S58, and a communication recording stop notification to authentication/accounting server 630 (step S70).

Upon receiving the communication recording stop notification, accounting control section 631 of authentication/accounting server 630 transmits the communication recording stop notification to database management section 633 together with the received IP phone number and URL (step S71).

Upon receiving the communication recording stop notification, database management section 633 searches IP phone number column 634a and URL column 634b of accounting management table 634, writes the date and time of receiving the communication recording stop notification into communication end date and time column 634d on a line to which both of the received IP phone number of broadband router apparatus 30 and the received URL of the content on WWW server 70 correspond, and rewrites determination column 634e with 1 indicating that communication has been completed.

HTTP communication that requests content on WWW server 70, for which authentication is required, from computer 20, and processing for accounting are completed by the above operation.

After that, every time an HTTP request requesting content, for which authentication by HTTP access authentication section 72 is required, is transmitted from computer 20 to WWW server 70, steps S58 to S71 described above are repeated.

When HTTP communication between computer 20 and WWW server 70 ends, processing similar to steps S14 to S18 (see FIG. 4) is performed, and an IP phone session is disconnected.

The present invention is applicable not only to the case where an IP phone provider operates an IP phone business independently but also to the case where an IP phone provider and an Internet service provider are the same provider. Similarly, even if an access line provider that provides an access line for connection to the Internet and an IP phone provider are the same provider, the present invention is applicable.

The present invention is not limited to an IP phone provider in the case of a telephone network performing call control using SIP.

The present invention has been described with reference to an exemplary embodiment. However, the present invention is not limited to the exemplary embodiment described above. Various modifications understandable to one skilled in the art can be made in the configuration and details of the present invention within the scope of the present invention.

The invention claimed is:

1. A communication system comprising:
a first server;
a second server; and
a broadband router connected to a computer,
wherein:
the broadband router is configured to:
transmit a first request to the first server to establish an IP phone session with the first server, the first request transmitted to the first server in response to receiving an HTTP request from the computer and includes an IP phone number associated with the broadband router;
transmit an IP address of the broadband router to the first server during establishment of the IP phone session; and
in response to establishment of the IP phone session with the first server, initiate a TCP connection with the first server and transmit the received HTTP request to the first server after establishment of the TCP connection, and
the first server is configured to:
receive the HTTP request from the broadband router;
transmit the HTTP request received from the broadband router to the second server, the HTTP request for accessing a URL on the second server;
store the IP phone number and the IP address of the broadband router in association with each other when the IP phone session is established;
receive a request from the second server for authentication information for accessing the URL;
in response to receiving the request for authentication information, acquire the IP phone number corresponding to the broadband router;
retrieve authentication information corresponding to the IP phone number and the URL;
transmit the retrieved authentication information to the second server;
receive an HTTP response from the second server after transmitting the authentication information to the second server, the HTTP response including content associated with the URL; and
transmit the received HTTP response to the broadband router.

2. The communication system according to claim 1, wherein the first server is further configured to notify the broadband router that the authentication information is not stored in the first server if the first server is unable to retrieve the authentication information.

3. The communication system according to claim 1, wherein the first server is further configured to:
in response to receiving the HTTP response from the second server, register a communication start time in association with the IP phone number and the URL; and
in response to a termination of HTTP communication between the broadband router and the second server, register a communication end time in association with the IP phone number and the URL.

4. A communication method comprising:
receiving, by a broadband router, an HTTP request from a computer connected to the broadband router;
transmitting, by the broadband router, a first request to a first server to establish an IP phone session between the first server and the broadband router, the first request transmitted in response to receiving the HTTP request and includes an IP phone number associated with the broadband router;

transmitting, by the broadband router, an IP address of the broadband router to the first server during establishment of the IP phone session;
establishing, by the broadband router, a TCP connection with the first server in response to establishment of the IP phone session;
transmitting, by the broadband router, the received HTTP request to the first server after the TCP connection is established;
receiving, by the first server, the HTTP request from the broadband router;
transmitting, by the first server, the HTTP request received from the broadband router to a second server, the HTTP request for accessing a URL on the second server;
storing, by the first server, the IP phone number and the IP address of the broadband router in association with each other when the IP phone session is established;
receiving, by the first server, a request from the second server for authentication information for accessing the URL;
in response to receiving the request for authentication information, acquiring, by the first server, the IP phone number corresponding to the broadband router;
retrieving, by the first server, authentication information corresponding to the IP phone number and the URL;
transmitting, by the first server, the retrieved authentication information to the second server;
receiving, by the first server, an HTTP response from the second server after transmitting the authentication information to the second server, the HTTP response including content associated with the URL; and
transmitting, by the first server, the received HTTP response to the broadband router.

5. A communication method comprising:
receiving, by a first server, a first request from a broadband router to establish an IP phone session with the first server, the first request including an IP phone number associated with the broadband router;
receiving, by the first server, an IP address of the broadband router during establishing of the IP phone session;
storing, by the first server, the IP phone number and the IP address of the broadband router in association with each other when the IP phone session is established;
receiving, by the first server, an HTTP request from the broadband router for accessing a URL on a second server;
transmitting, by the first server, the received HTTP request to the second server;
receiving, by the first server, a request from the second server for authentication information for accessing the URL;
acquiring, by the first server, an IP phone number corresponding to the broadband router in response to receiving the request for authentication information;
retrieving, by the first server, authentication information corresponding to the IP phone number and the URL;
transmitting, by the first server, the retrieved authentication information to the second server;
receiving, by the first server, an HTTP response from the second server after transmitting the authentication information to the second server, the HTTP response including content associated with the URL; and
transmitting, by the first server, the received HTTP response to the broadband router,
wherein the first server includes a processor.

6. The communication method according to claim 5, further comprising:
registering, by the first server, a communication start time in association with the IP phone number and the URL, the registering in response to receiving the HTTP response from the second server.

7. The communication method according to claim 6, further comprising:
registering, by the first server, a communication end time in association with the IP phone number and the URL corresponding to the HTTP response, the registering in response to a termination of HTTP communication between the broadband router and the second server.

8. The communication method of claim 5,
wherein the first request is received by the first server prior to receiving the HTTP request.

* * * * *